Oct. 21, 1958    G. R. SCHNORE    2,856,708

ATTACHMENT FOR BULLDOZER BLADES

Filed Jan. 3, 1955

INVENTOR.
GEORGE R. SCHNORE
BY
Cook and Schermerhorn
ATTORNEYS

United States Patent Office 2,856,708
Patented Oct. 21, 1958

2,856,708

ATTACHMENT FOR BULLDOZER BLADES

George R. Schnore, Roseburg, Oreg.

Application January 3, 1955, Serial No. 479,277

6 Claims. (Cl. 37—145)

This invention relates to a combination ripping and clearing attachment for bulldozer blades.

A primary utility of bulldozers is general clearing and leveling work for the preparation of road beds, building sites, farm lands, and the like. Such areas most generally are covered with trees and underbrush, and when clearing and leveling such areas it is desirable that the subsurface be cleared of roots and other obstructions. Bulldozer blades have heretofore been equipped with ripping or grubbing teeth attachments for digging roots and for scarifying work, but these attachments have not proven to be entirely satisfactory because they must be detached from the blade before the blade can be used for general ground moving and leveling work. Consequently, when it is desired to clear out roots or to do scarifying work, the ripping attachments must be installed and when it is desired to accomplish general earth moving and leveling work, such attachments must be removed. The repeated installation and removal of the attachment is of considerable inconvenience, and also consumes valuable work time.

A primary object of the invention, therefore, is to provide an attachment for bulldozer blades which comprises combination ripping and clearing means in such form that the attachment is also capable of general earth moving and leveling work.

Further objects are to provide a combination ripping and clearing attachment for bulldozer blades which has novel means for rapidly and conveniently mounting said attachment on a blade; which is constructed in sections for convenient handling, which is constructed to fit standard types of bulldozer blades, and which is rugged and durable in operation.

In brief, the invention resides in an attachment for bulldozer blades and comprises a plurality of sections having teeth thereon which are adapted to serve as ripping and clearing means without interfering with the earth moving function of the conventional form of blade. Each of the toothed sections is provided with novel mounting means whereby said sections are removably mounted in transverse alignment adjacent the bottom of the bulldozer blade. The invention will be better understood and additional objects and advantages will become apparent from the following description taken in connection with the accompanying drawings which illustrate a preferred form of the invention. It is to be understood, however, that the invention may take other forms and that all such modifications and variations within the scope of the appended claims which will occur to persons skilled in the art are included in the invention.

In the drawings:

Figure 2 is an end elevational view of a conventional bulldozer blade;

Figure 1:
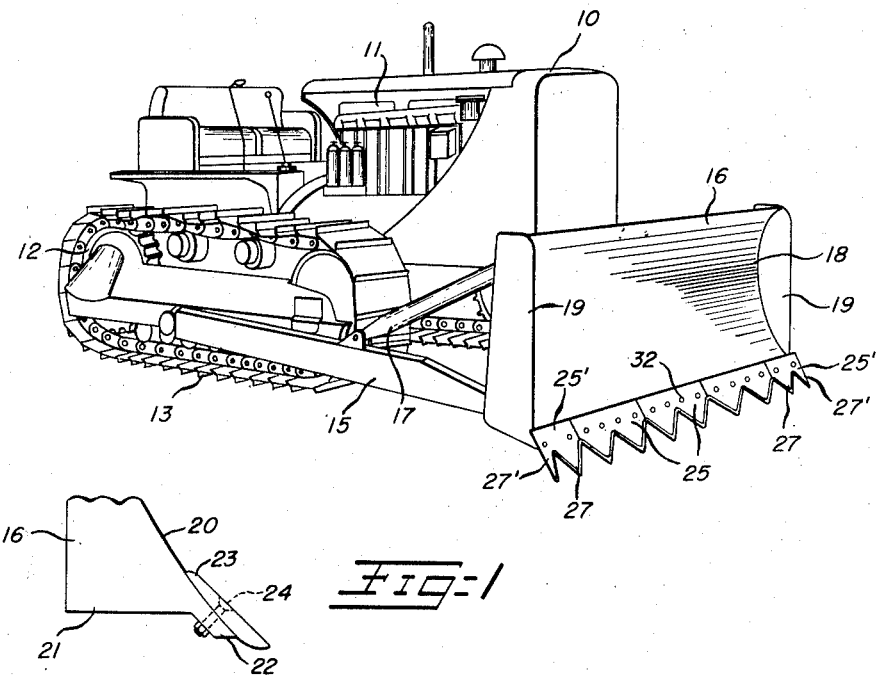
Figure 1 is a perspective view of a tractor with bulldozer blade and showing the present attachment mounted on said blade.

Referring to the drawings, the numeral 10 represents a tractor of well-known construction. The tractor 10 is driven by a motor 11 conveying power to track gears 12 which drive endless tracks 13. A pair of arms 15 are pivoted to the track structure and support at their outer ends a bulldozer blade 16 of conventional design. The arms 15 are reinforced by angular struts 17 and the blade as a whole is adjustable vertically by power lift means, not shown.

Blade 16 generally comprises a curved moldboard 18 having a pair of end plates 19. As seen in the end elevational view of Figure 2, wherein end plate 19 has been removed, the blade is thickened at the bottom and has a curved front face 20, a flat bottom edge 21, and a lip portion 22 which projects below the bottom edge 21. Secured transversely to the face 20 of the blade 16 adjacent the bottom is a cutting bit 23, the bit 23 projecting a short distance below the bottom of the lip 22 to serve as the cutting edge for the blade 16, and being held in place by a plurality of bolts 24 passing through the bit and projection 22.

Figure 4:
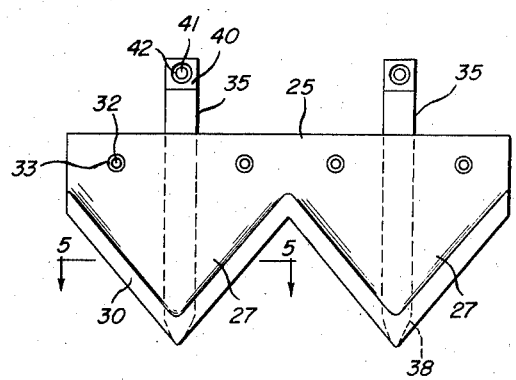
Figure 4 is a front elevational view of one of the attachment sections.

The present invention will now be described, comprising a plurality of body sections 25 which, when secured to the blade 16, as shown in Figure 1, provide a combination ripping and clearing attachment for a bulldozer blade. Each of the sections 25, as best shown in Figure 4, has two teeth or serrations 27, although it is to be understood that these sections may comprise merely a single tooth, or may comprise more than two teeth. Primarily, it is intended that each of the sections 25 be readily portable by a single person, and, therefore, a preferred arrangement is to provide enough sections in the width of the blade so that the weight of each section is kept below a desired maximum. The width of blade 16 varies with different size bulldozers, and, of course, the number of sections 25 which may be applied thereon will, accordingly, vary.

Figure 5:
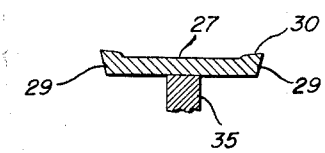
Figure 5 is a sectional view taken on the line 5—5 of Figure 4.

Teeth 27 are cut to a predetermined size so as to project a sufficient distance below the surface of the ground to accomplish a ripping or grubbing action. Edges 29 of teeth 27 are beveled, as seen in Figure 5, and the teeth 27 are provided with a case hardened raised bead 30 on the upper surface adjacent the edges 29 to prevent damage to the cutting edge in the event rocks or the like are encountered.

Figure 3:
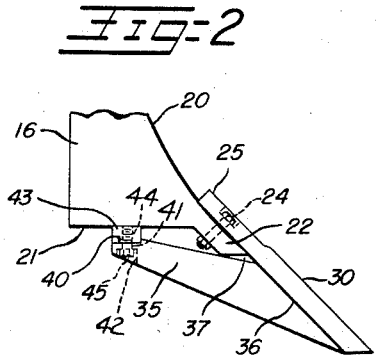
Figure 3 is an end elevational view of the lower portion of a bulldozer blade showing in detail the manner of mounting the attachment thereon.

Each of the body sections 25 is provided with a plurality of bores 32 having counterbores 33, the bores 32 being spaced apart a predetermined amount to conform to the spacing of the bores in the bit 23 and projection 22 which receive the bolts 24. A pair of supporting arms 35 have a beveled end edge 36, and these arms are secured to the sections 25 by welding the beveled edge 36 to the rear surface thereof, or, of course, the arms and body section may be cast as one piece. The beveled edges 36 present elongated supporting edges for the toothed sections, and, as best seen in Figure 3, the edges 36 engage section 25 from the points of the teeth to a position at least half the height of the section, the upper portion of tooth section 25 forming a V-shaped slot 37 with the top edge of the arms 35. The teeth are thereby re-inforced from the rear to prevent breakage. Arms 35 are beveled at 38, Figure 4, adjacent the teeth points to conform to the shape of the cutting edge of the teeth.

Arms 35 are notched at 40 at their free ends, and these notched portions are provided with bores 41 and counterbores 42. Adapted to be engaged in the notches 40 is a longitudinal mounting bar 43 having tapped bores 44 spaced so as to be in alignment with bores 41. Bar 43 is secured to the arms 35 by screws 45 which pass through bores 41 and are threadedly engaged in tapped bores 44. A separate bar 43 may be provided for each section 25, or several or all of the sections 25 may be attached to a single long bar 43.

To mount the present device on a bulldozer blade, the cutting bit 23 of the blade 16 is first removed by taking out bolts 24. The sections are fitted on the blade as shown in Figure 3 with the lip 22 fitted in V-shaped slots 37 and, as the bores 32 in the sections 25 are spaced to conform to the spacing of the bores in the bit 23 and lip 22 for bolts 24, the sections 25 can be quickly bolted on by using the same bolts.

In the initial installation of the present attachment on the blade, the bar 43 is secured in the notches 40 of arms 35 by screws 45 and then, when the sections are fitted precisely in place with screws 45 tightened, the bar is welded to the bottom edge 21 of the blade 16. Thereafter the bar comprises an integral part of the bulldozer blade, and the auxiliary tooth sections are disengageable therefrom by removal of screws 45 and bolts 24. Subsequent installations merely comprise fitting the sections 25 in place and inserting bolts 24 and screws 45.

Referring to Figure 1, the two end sections of the present attachment are designated by the reference numerals 25' and comprise one complete tooth 27 and a half tooth 27'. This is a preferred arrangement, but, of course, the one type of section as shown in Figure 4 may be used for the end and the intermediate sections as well.

It will occur to persons skilled in the art that the present invention comprises an improvement in attachments for bulldozer blades whereby the blade can be used for either general earth moving or for ripping or grubbing. In fact, the blade with the present attachment thereon is capable of simultaneously performing earth moving and grubbing work as, for example, where land is being cleared and leveled. The attachment may be used for scarifying road surfaces or other heavy work, and, in general, it can remain on the bulldozer blade for most uses of the bulldozer. Therefore, the attachment need not be removed from the blade except in rare circumstances. These advantages result from the broad, flat and stubby triangular shape of the teeth wherein the tooth angle is almost 90° and the base width of each tooth exceeds its length. This shape provides a relatively broad tooth area for earth moving whereas conventional ripper teeth are long and slender and are ineffective for earth moving work.

Having now described my invention and in what manner the same may be used, what I claim as new and desire to protect by Letters Patent is:

1. A ripping and clearing attachment for a bulldozer blade comprising a toothed member having a continuous serrated cutting edge and a continuous rear edge adapted to overlie the lip of the blade, means for securing said rear edge to the lip of the blade, projecting tooth portions formed by said serrated cutting edge having working surfaces substantially in the plane of said lip, an arm projecting rearwardly from the under side of each tooth portion at an oblique angle to said plane, and means for securing said arms to the bottom of the blade.

2. An attachment as defined in claim 1 in which said last means comprises a bar secured to a plurality of said arms and adapted to be welded to the bottom of the blade.

3. A ripping and clearing attachment for a bulldozer blade comprising a toothed member having a continuous serrated cutting edge and a continuous rear edge adapted to overlie the lip of the blade, bolt holes in said overlying edge for detachably securing said edge to the lip of the blade, projecting tooth portions formed by said serrated cutting edge having working surfaces substantially in the plane of said lip, an arm projecting rearwardly from the under side of each tooth portion at an oblique angle to said plane, notched rear ends on said arms, and a bar secured by screws in the notches of a plurality of said arms and adapted to be welded to the bottom of the blade.

4. A ripping and clearing attachment for a curved moldboard bulldozer blade having a lower edge portion and a bottom surface extending rearwardly therefrom, comprising a substantially flat plate-like member having a continuous rear edge adapted to overlie said edge portion of the blade and be secured thereto, said member having a front edge with spaced tooth points projecting forwardly substantially in the plane of said member and generally V-shaped cutting edges recessed between said tooth points, a thrust arm projecting rearwardly from each tooth point in a straight line at an oblique angle to said plate member and adapted to underlie said bottom surface of the blade, and thrust reaction means for securing the rear ends of said arms to said bottom surface of the blade.

5. An attachment as defined in claim 4 in which said means comprises a thrust abutment member adapted to be secured to said arms and adapted to be welded to said bottom surface of the blade.

6. A ripping and clearing attachment for a curved moldboard bulldozer blade having a downwardly and forwardly sloping lower edge portion and a bottom surface extending rearwardly therefrom, comprising a substantially flat plate-like member having a continuous rear edge adapted to overlie said edge portion of the blade to be secured thereto with said member projecting downwardly and forwardly in continuation of said blade, said member having a serrated front edge with spaced tooth points and generally V-shaped cutting edges recessed between said tooth points, the upper working surfaces of said tooth points being approximately in the plane of said member so that material cut and dislodged by said tooth points and cutting edges will be scooped up by said member for removal by said blade, a thrust arm projecting rearwardly from each tooth point approximately in the line of thrust of the tooth point and at an oblique angle to said plate member, said thrust arms being arranged to underlie said bottom surface of the blade, and thrust reaction means for securing the rear ends of said arms to said bottom surface of the blade.

References Cited in the file of this patent

UNITED STATES PATENTS

| | | |
|---|---|---|
| 1,128,399 | Atkinson | Feb. 16, 1915 |
| 1,503,866 | Washburn et al. | Aug. 5, 1924 |
| 1,741,933 | Gunnison | Dec. 31, 1929 |
| 1,861,494 | Devereux | June 7, 1932 |
| 2,221,906 | Birk | Nov. 19, 1940 |
| 2,705,380 | Hensley | Apr. 5, 1955 |